United States Patent
Tylik et al.

(10) Patent No.: US 11,556,441 B2
(45) Date of Patent: Jan. 17, 2023

(54) DATA STORAGE CLUSTER WITH QUORUM SERVICE PROTECTION

(71) Applicant: EMC IP Holding Company LLC, Hopkinton, MA (US)

(72) Inventors: Dmitry Nikolayevich Tylik, Westborough, MA (US); David Meiri, Somerville, MA (US); Carole Gelotti, Hollis, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 29 days.

(21) Appl. No.: 17/232,568

(22) Filed: Apr. 16, 2021

(65) Prior Publication Data

US 2022/0334934 A1    Oct. 20, 2022

(51) Int. Cl.
| | |
|---|---|
| *G06F 11/00* | (2006.01) |
| *G06F 11/20* | (2006.01) |
| *G06F 13/16* | (2006.01) |
| *G06F 3/06* | (2006.01) |
| *G06F 11/07* | (2006.01) |

(52) U.S. Cl.
CPC .......... *G06F 11/2094* (2013.01); *G06F 3/065* (2013.01); *G06F 3/067* (2013.01); *G06F 3/0619* (2013.01); *G06F 3/0653* (2013.01); *G06F 3/0659* (2013.01); *G06F 11/0727* (2013.01); *G06F 11/0745* (2013.01); *G06F 13/1668* (2013.01); *G06F 2201/85* (2013.01)

(58) Field of Classification Search
CPC ............. G06F 11/2094; G06F 11/0727; G06F 11/0745; G06F 2201/85

USPC ........................................................ 714/1–57
See application file for complete search history.

(56) References Cited

U.S. PATENT DOCUMENTS

| | | | |
|---|---|---|---|
| 7,328,302 B2 * | 2/2008 | Fischer | G11C 16/3436 714/54 |
| 7,356,728 B2 | 4/2008 | Tawil et al. | |
| 7,568,227 B2 * | 7/2009 | Lyle | H04L 63/1416 714/39 |
| 7,870,235 B2 | 1/2011 | Arendt et al. | |
| 7,890,555 B2 | 2/2011 | Gunda et al. | |
| 7,941,628 B2 | 5/2011 | Kalos et al. | |
| 9,262,229 B2 | 2/2016 | Lee et al. | |
| 9,934,089 B2 | 4/2018 | Hayes et al. | |
| 2003/0115503 A1 * | 6/2003 | Lehman | G06F 21/75 714/25 |

(Continued)

*Primary Examiner* — Sarai E Butler
(74) *Attorney, Agent, or Firm* — BainwoodHuang

(57) ABSTRACT

In a protective quorum service, during an initial period of normal operation in which a clustered pair of data storage nodes provide host I/O access to a data storage object and replicate write-type requests to each other, the nodes are first registered to the quorum service. Subsequently, based on the registration and in response to a first auto promote request from a first-requesting node, a success response is returned and the service enters an auto promoted condition, the success response indicating that the first-requesting node is to continue providing the host I/O access to the data storage object without write replication. In response to receiving a subsequent auto promote request from the other node when in the auto promoted condition, a failure response is returned indicating that the other node is to cease providing host I/O access to the data storage object.

20 Claims, 5 Drawing Sheets

(56) References Cited

U.S. PATENT DOCUMENTS

| | | | | |
|---|---|---|---|---|
| 2003/0167375 A1* | 9/2003 | Morishita | ............... | G06F 3/067 |
| | | | | 711/E12.019 |
| 2005/0289391 A1* | 12/2005 | Ichikawa | ............ | G06F 11/2046 |
| | | | | 714/E11.073 |
| 2006/0036896 A1* | 2/2006 | Gamache | ............ | G06F 11/2023 |
| | | | | 714/E11.073 |
| 2006/0221720 A1* | 10/2006 | Reuter | .................. | G06F 3/0659 |
| | | | | 365/189.05 |
| 2012/0192006 A1* | 7/2012 | Qi | ....................... | G06F 11/2071 |
| | | | | 714/E11.089 |
| 2015/0169415 A1* | 6/2015 | Hildebrand | ........... | G06F 3/0604 |
| | | | | 714/4.5 |
| 2016/0021043 A1* | 1/2016 | Modi | ....................... | H04L 45/44 |
| | | | | 709/206 |
| 2017/0316222 A1* | 11/2017 | Muhlestein | ............. | G06F 16/16 |
| 2018/0143887 A1* | 5/2018 | Zhang | ................ | G06F 11/2048 |
| 2021/0099433 A1* | 4/2021 | Soryal | ............... | H04N 21/8166 |

* cited by examiner

DATA STORAGE CLUSTER WITH QUORUM SERVICE PROTECTION

BACKGROUND

The invention is related to the field of data storage, and more particularly to operation of clustered data storage systems providing high availability, distributed host access to data storage objects such as volumes, files, etc.

SUMMARY

A method is disclosed of providing a quorum service to a clustered pair of data storage nodes to protect against data corruption by failure of inter-node replication of write-type host I/O requests directed to a data storage object. During an initial period of normal operation in which the data storage nodes each provide host I/O access to the data storage object and each replicate write-type requests to the other node, each of the data storage nodes is registered to the quorum service in response to respective registration requests therefrom. Subsequently and based on both the data storage nodes being registered, in response to receiving a first auto promote request from a first-requesting data storage node, a success response is returned and the quorum service enters an auto promoted condition, the success response indicating that the first-requesting data storage node is to continue providing the host I/O access to the data storage object without replicating the write-type host I/O requests to the other data storage node. In response to receiving a subsequent auto promote request from the other data storage node when in the auto promoted condition, a failure response is returned indicating that the other data storage node is to cease providing host I/O access to the data storage object. The use of the quorum service helps avoid so-called "split brain" operation that could lead to data corruption.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Figure 1:
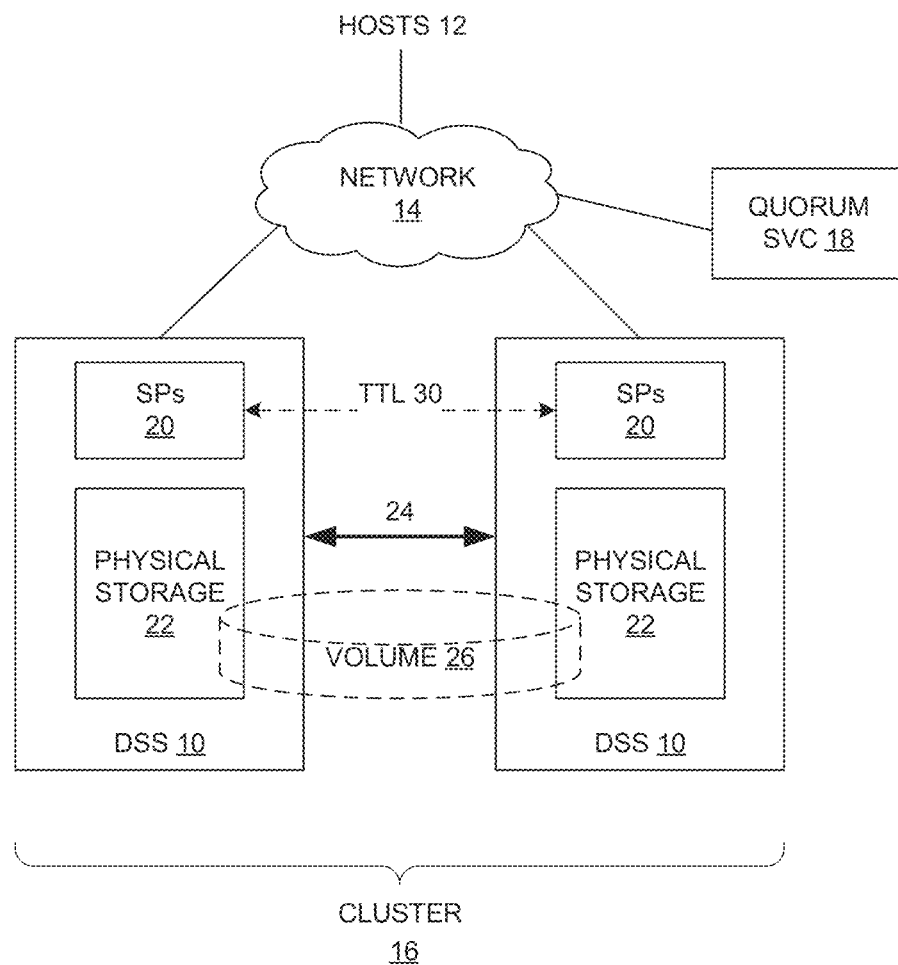
FIG. 1 is a block diagram of a data processing system with clustered data storage systems providing access to a stretched volume.

Metro cluster is a storage array deployment in which two storage arrays typically deployed in two different data centers or two server rooms within the same data center cooperate to expose a single "stretched" volume to application hosts, making those hosts and applications running on them perceive two volumes hosted by the two arrays as a single volume. Primary metro cluster use cases are:

1. Increased availability and disaster avoidance.
2. Resource balancing across datacenters.
3. Storage migration.

Metro cluster configurations are popular with customers looking for highest levels of resiliency against failures including complete failure of one of participating storage arrays or network connectivity failure between arrays. Participating storage arrays detect failures based on ability to communicate with the other array. Communication failures indicate either network link or other array failure. To avoid split brain situations (when both arrays keep their sides of the stretched volume online, without replicating changes), TTL based Polarization algorithm can be used. One storage array, designated as "preferred" for the volume, regularly grants TTL to its peer, designated as "non-preferred". In such configuration, non-preferred lives at the mercy of preferred, and once its TTL expires, takes its side of the stretched volume offline in a process called Polarization.

The following table outlines the effect of using TTL polarization:

| Preferred Array | Non-preferred Array | Link | Resolution |
|---|---|---|---|
| Alive | Alive | Alive | Online on both arrays |
| Alive | Alive | Failed | Online only on Preferred |
| Alive | Failed | Alive | Online only on Preferred |
| Failed | Alive | Alive | Offline on both arrays |

As the above table shows, polarization does not handle Preferred array failure, because the Non-Preferred always takes its side of the stretched volume offline if unable to communicate with the preferred. This shortcoming can be improved by introducing a third component—quorum service, so before taking stretched volume offline, the non-preferred array can attempt to establish quorum with the quorum service. If the quorum is established the non-preferred array can keep the stretched volume online knowing the preferred array can no longer establish quorum and will take the stretched volume offline avoiding split brain.

To introduce a quorum service, behavior for three communicating components needs to be defined—quorum service, enhanced polarization algorithm for the preferred array and enhanced polarization algorithm for the non-preferred array, where each makes decisions based on communications with the other two or inability to communicate. Three components working together shall never result in both arrays servicing host I/O requests to a stretched volume without being able to replicate data to each other, as this easily leads to data corruption. So acceptable outcomes are:

1. Preferred and non-preferred arrays can replicate data to each other and both continue servicing host I/O to the stretched volume. It does not really matter if the arrays can communicate with the quorum service.
2. Only one array continues servicing host I/O. The other one takes its side of the stretched volume offline.
3. None of arrays service host I/O to the stretched volume.

In some embodiments, the following considerations may also be applicable:

1. If an array is not certain it is safe to continue servicing I/O it better take its side of the stretched volume offline.
2. It may be acceptable to request user interaction to resolve corner case situations leading to both sides of a stretched volume offline, which are otherwise difficult to resolve through algorithms. These should be infrequent occurrences with well documented procedures and clear notifications via user interface.

The solution is the use of a quorum service as generally outlined above in the Summary, for which an illustrative embodiment is described below.

Description of Embodiments

FIG. 1 shows a data processing system having a plurality of data storage systems (DSSs) 10 and host computers (HOSTS) 12 functionally coupled by one or more data communications networks 14. The DSSs 10 constitute a clustered storage system 16, also referred to as a "cluster" herein. The system also includes a computerized subsystem referred to as a "quorum service" 18. The DSSs 10, which are also referred to as "storage nodes", "nodes", and "arrays" herein, include respective storage processors (SPs) 20 and physical storage 22. Each storage processor 20 includes processors, memory and interface logic enabling it to execute storage related functionality using the associated physical storage 22 for underlying actual data storage, i.e., processing host I/O requests (reads and writes) from the hosts 12. The physical storage 22 may be realized by known secondary storage technology such as magnetic disk, Flash memory, etc.

As shown, the system further includes one or more replication links 24 between the DSSs 10, which may be distinct physical links or logical links carried via the network 14. For ease of reference the singular "replication link" is used in this description. Also shown is a logical volume 26 that can be accessed by the hosts 10 via both the DSSs 10, under normal operating conditions. In one embodiment the cluster 16 is a high-availability cluster whose nodes/DSSs 10 reside in different physical locations, such as different buildings of a campus or across some other limited geographic area (e.g., tens of miles). The volume 26 may be referred to as a "stretched" volume, referring to its logical presence on such physically separated DSSs 10. In normal operation, each DSS 10 services host I/O requests to the volume 26, which includes replicating write-type requests to the other DSS 10 via the replication link 24.

Although the present description is focused on access to a volume 26 specifically, it will be appreciated that the disclosed technique may be used with other types of data storage objects such as volume groups, files and file systems, virtual volumes (vVOLs), containers, etc.

The quorum service 18 is used by the DSSs 10 in the event of a failure (e.g., replication failure) having the potential to create a so-called "split brain" problem in which one DSS 10 is modifying its local copy of the volume 26 without such modifications also being made on the other DSS 10, resulting in data corruption. Essentially, the quorum service 18 selects one of the DSSs 10 as a surviving node to continue servicing host I/Os without replication, and stopping the other DSS 10 from ongoing servicing of host I/Os. Details of the quorum service 18 and its interaction with the DSSs 10 are provided below. In the illustrated embodiment the DSSs 10 also utilize a logical session referred to as "time to live" or TTL 30 as part of this protection, but in alternative embodiments some different inter-DSS protection mechanism may be used or there may be no such mechanism at all, with reliance on just the quorum service 18. While the present description assumes use of the TTL mechanism 30, those skilled in the art will understand that there will be differences in operation of such alternative embodiments.

Briefly regarding the TTL mechanism 30, one DSS 10 ("preferred") regularly grants permission for continued operation to the other DSS 10 ("non-preferred"), so that both DSSs 10 provide host access to the volume 26 as long as this permission stays in effect. Under various failure conditions, the TTL mechanism 30 either fails itself (signifying the failure) or it is used in a manner that signals a separately detected failure from one DSS 10 to the other (i.e., by stopping the requesting or granting of permission). At such a point, the DSSs 10 then utilize the quorum service 18 to select a survivor, as described more below.

Because of the protection function of the quorum service 18, it is preferably located in a different fault domain than either of the DSSs 10, e.g. in a different building or other physical location to improve its availability when there is a failure affecting one or both DSSs 10 or the replication link 24.

Figure 2:
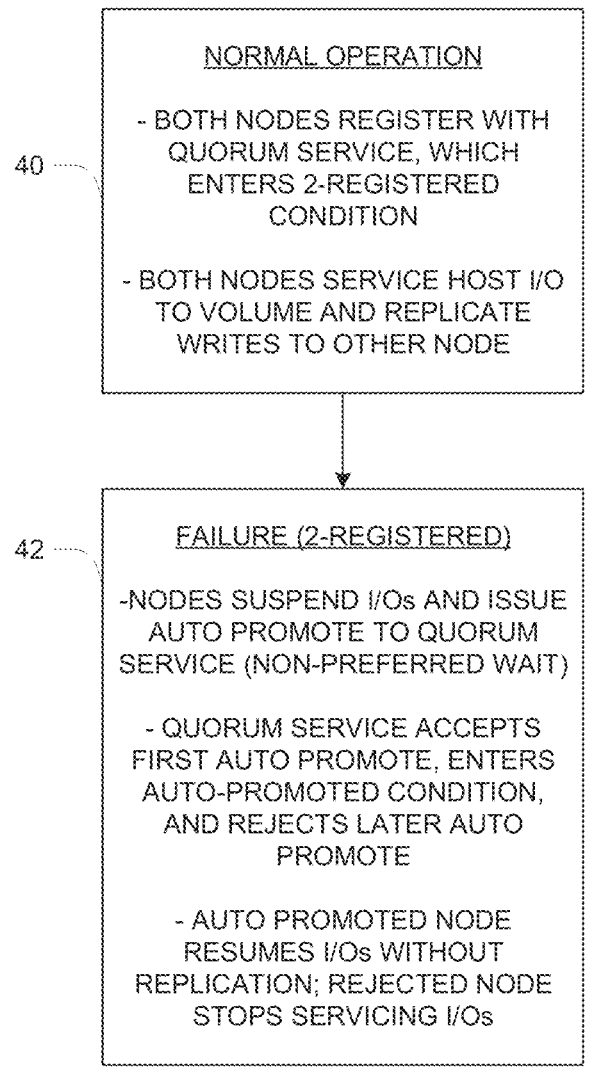
FIG. 2 is a simplified flow diagram of overall operation of a data storage system using a quorum service to avoid so-called "split brain" condition and data corruption.

FIG. 2 outlines overall operation of the operation and use of the quorum service 18. At 40, during an initial period of normal operation in which the data storage nodes 10 each provide host I/O access to a data storage object (e.g., volume 26) and each replicates write-type requests to the other node 10, each of the data storage nodes 10 is registered to the quorum service 18 in response to respective registration requests therefrom. At this point the quorum service 18 enters what is referred to as a "2-registered" condition, meaning that both nodes 10 are properly registered and thus the remaining quorum functionality is enabled. As explained more below, the registration is important for coherent operation, and therefore if there are problems with registration the quorum service 18 refrains from providing the key auto promote functionality until they are resolved.

At 42, based on being in the 2-registered condition, and in response to receiving a first auto promote request from a first-requesting data storage node 10, the quorum service 18 returns a success response (acceptance) and enters an auto promoted condition. The success response indicates that the first-requesting data storage node 10 is to continue providing the host I/O access to the data storage object (volume 26) without replicating the write-type host I/O requests to the other data storage node 10. Subsequently, in response to receiving an auto promote request from the other data storage node 10 when in the auto promoted condition, the quorum service 18 returns a failure response (rejection) indicating that the other data storage node 10 is to cease providing host I/O access to the data storage object. By this operation, the first-requesting node 10 is selected as the survivor to provide sole access to the storage object without replication, avoiding split-brain operation and attendant potential data corruption.

Although step 40 contemplates respective registration requests being sent by nodes 10, in alternative embodiments the registration of both nodes 10 may be done in some other fashion. For example, there may be only one registration request sent, by either of the nodes 10 for example, and the request either explicitly or implicitly serves to register both nodes 10. In such an embodiment it would be up to the nodes themselves to share quorum service identifier and any other pertinent information, so that they properly use the same quorum service for protection.

Quorum Service API and State Transition Diagram

The quorum service 18 supports application programming interface (API) commands as described below. All API commands are preferably handled in idempotent fashion with transactional persistence of state changes.

As noted above, the present description is focused on volumes in particular, while being more generally applicable to data storage objects of various types (examples above). The present focus on volumes in particular is reflected in the quorum API, FIG. 3 and related description below. Those skilled in the art will appreciate that in alternative embodiments the <volume id>, for example, may be generalized to an <object id> or may be substituted with a different object type, e.g., <file id>. The use of the example <volume id> in this description should not be taken as limiting the applicability of the disclosed technique.

Quorum API commands:

1. "get uuid"—returns quorum service uuid generated by the quorum upon initialization. The uuid shall never change unless the quorum service is completely replaced.

2. "register <volume id><array id>"—registers an array identified by <array id> to communicate through the quorum service for the stretched volume with <volume id>. Receipt of "register <volume id><array id>" with the same <array id> as in "<volume id> auto promoted <array id>" means the volume is back in sync across arrays and shall clear "auto promoted" record.

3. "unregister <volume id><array id>"—remote the array from the list of arrays registered to communicate through the quorum service for the stretched volume <volume id>.

4. "auto promote <volume id><array id>"
   a. Records "<volume id> auto promoted <array id>" if two arrays are registered for the stretched volume and it is not yet promoted.
   b. Fails if just one array is registered or the volume is already promoted by a different array (but not by the same array—idempotency).

5. "auto promoted <volume id><array id>"—periodic "auto promoted <volume id><array id>" invocation by the array that has successfully promoted the volume is allowed, to restore "<volume id> auto promoted <array id>" if quorum service persistence is lost.

6. "manual promote <volume id><array id>"—allows to record "<volume id> manually promoted <array id>" over "auto promote" or "manual promote". This API command allows a storage administrator to override automated decisions.

7. "manual promoted <volume id><array id>"—periodic "manually promoted <volume id><array id>" invocation by the array that has successfully promoted the volume is allowed, to restore "<volume id> manually promoted <array id>" if quorum service persistence is lost.

Figure 3:
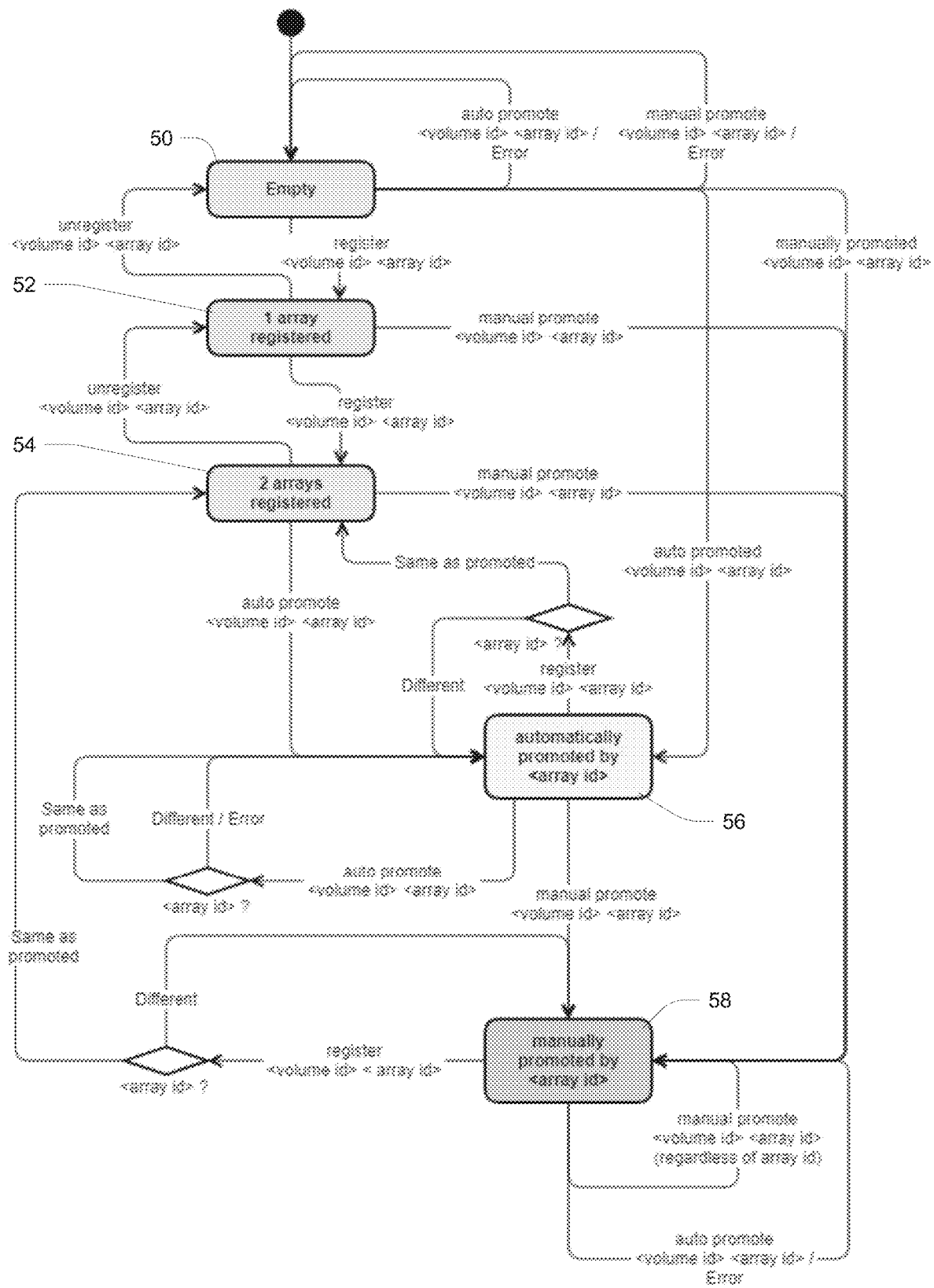
FIG. 3 is a flow diagram of operation of the quorum service.

FIG. 3 is a state transition diagram illustrating operation of the quorum service 18. In normal operation it proceeds from an Empty state 50 to a 1-Registered state 52 and then a 2-Registered state 54, at which point it is ready to provide a response to an auto promote request from one of the arrays 10. Upon receiving such a request, the request is granted (accepted) and operation proceeds to an Auto Promoted state 56, where the basic function is to then deny (reject) any subsequent auto promote request. Also shown in FIG. 3 is a Manually Promoted state 58 which is reached in response to a manual promote operation of an administrative user. The manual promote functionality enables the administrative user to exert control in response to certain failure conditions, such as outlined below in the failure analysis section.

Figure 4:
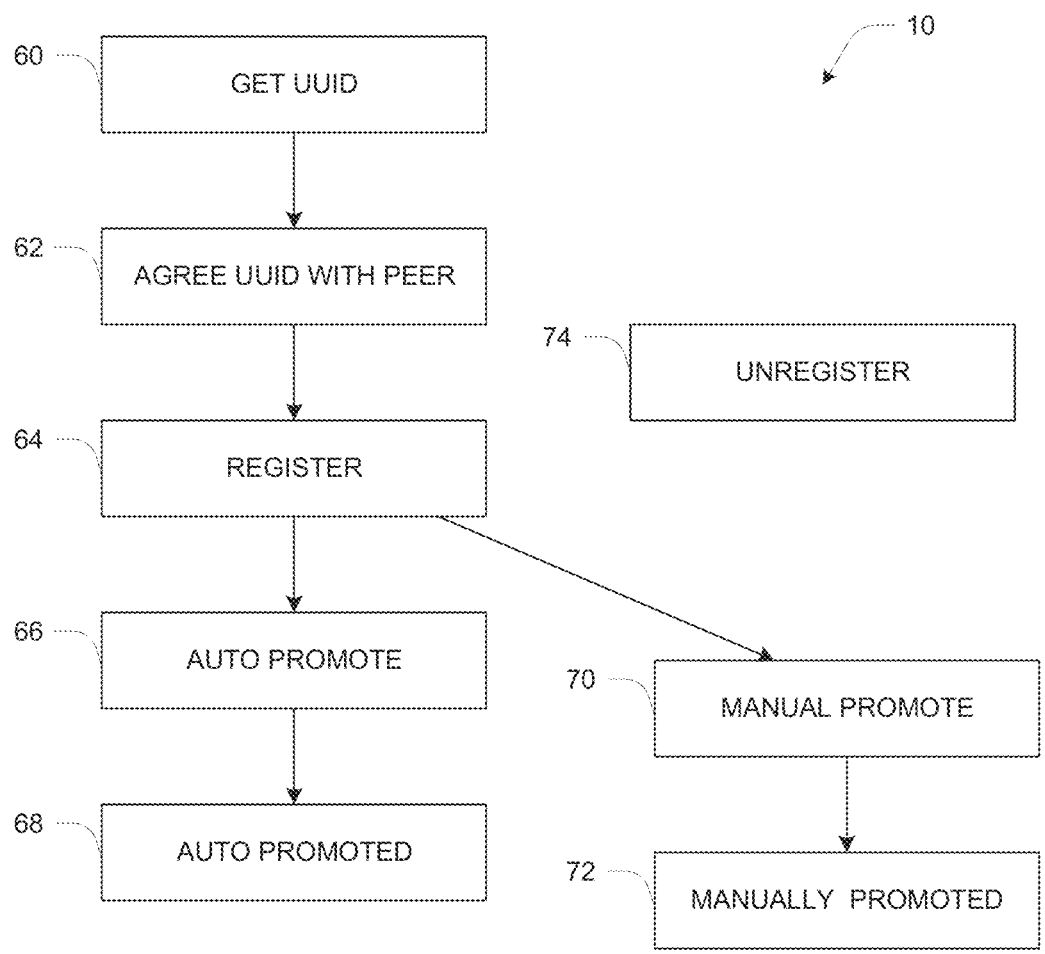
FIG. 4 is a schematic diagram of operation of a data storage system in connection with the quorum service.

A more detailed explanation of FIG. 3 follows after first outlining the use of the quorum API by the DSSs 10 with reference to FIG. 4.

FIG. 4 describes key operations of the DSSs 10 in using the quorum service 18. Operations are shown and described in a sequence corresponding generally to the timing of their use during a period of operations.

1. At 60, each array 10 retrieves quorum service universal identifier (uuid) with "get uuid" as soon as its registered.

2. At 62, each array 10 exchanges quorum service uuid with the peer array 10 as part of TTL messages, and uses the quorum service for conflict resolution only if both agree on the quorum service to use (as indicated by exchanging the same uuid). This operation enables the arrays 10 to present quorum service state to the user—if volumes are protected with an agreed quorum service 18 or not. Note that this process also allows for negotiating/selecting one out of multiple available quorum services if required.

3. At 64, each array 10 invokes "register <volume id><array id>" to the quorum service 18 periodically once the quorum service 18 is registered on the array 10.

4. At 66, each array 10 uses "auto promote <volume id><array id>" for failure resolution during polarization. If the arrays 10 are configured with preferred and non-preferred status per the TTL mechanism 30, then the preferred array 10 will normally issue an auto promote immediately, whereas the non-preferred array would do so after a delay (e.g., several seconds), which biases the process toward success for the preferred array 10. This auto promote requesting may be retried periodically, keeping the volume 26 offline until successful.

5. At 68, the array 10 that has been auto promoted and keeps the stretched volume 26 online can send an "auto promoted <volume id><array id>" to repopulate quorum service state if lost.

6. At 70, an array 10 invokes "manual promote <volume id><array id>" if a volume 26 was manually promoted on a non-preferred array 10 (by operation of a storage administrator). This manual promote may also be retried periodically until successful.

7. At 72, an array 10 invokes "manual promoted <volume id><array id>" periodically during polarization once manual promote is successful to repopulate quorum service state if lost.

8. At 74, an array 10 invokes "unregister <volume id><array id>" to the quorum service 18 as part of removing quorum service 18 from configuration or replacing the quorum service 18 with a new one.

Now returning to FIG. 3, operation is summarized using the following state transition table:

| Current State | Event | Next State |
|---|---|---|
| Empty 50 | 1-register (1$^{st}$ array) | 1-1-Registered 52 |
| | 2-auto promoted (restore) | 2-Auto Promoted 56 |
| | 3-manually promoted (restore) | 3-Manually Promoted 58 |
| | 4-auto promote or manual promote (erroneous) | 4-Empty 50 |
| 1-Registered 52 | 1-register (2$^{nd}$ array) | 1-2-Registered 54 |
| | 2-manual promote (1$^{st}$ array) | 2-Manually Promoted 58 |
| | 3-unregister (1$^{st}$ array) | 3-Empty 50 |
| 2-Registered 54 | 1-auto promote (array) | 1-Auto Promoted 56 |
| | 2-manual promote (array) | 2-Manually Promoted 58 |
| | 3-unregister (array) | 3-1-Registered 52 |
| Auto Promoted 56 | 1-auto promote (different array-error/reject) | 1-Auto Promoted 56 |
| | 2-auto promote (same array-accept) | 2-Auto Promoted 56 |
| | 3-manual promote (array) | 3-Manually Promoted 58 |
| | 4-register (same array) | 4-2-Registered 54 |
| | 5-register (different array-error) | 5-Auto Promoted 56 |
| Manually Promoted 58 | 1-manual promote (array) | 1-Manually Promoted 58 |
| | 2-auto promote (error/reject) | 2-Manually Promoted 58 |
| | 3-register (same array) | 3-2-Registered 54 |
| | 4-register (different array) | 4-Manually Promoted 58 |

Figure 5:
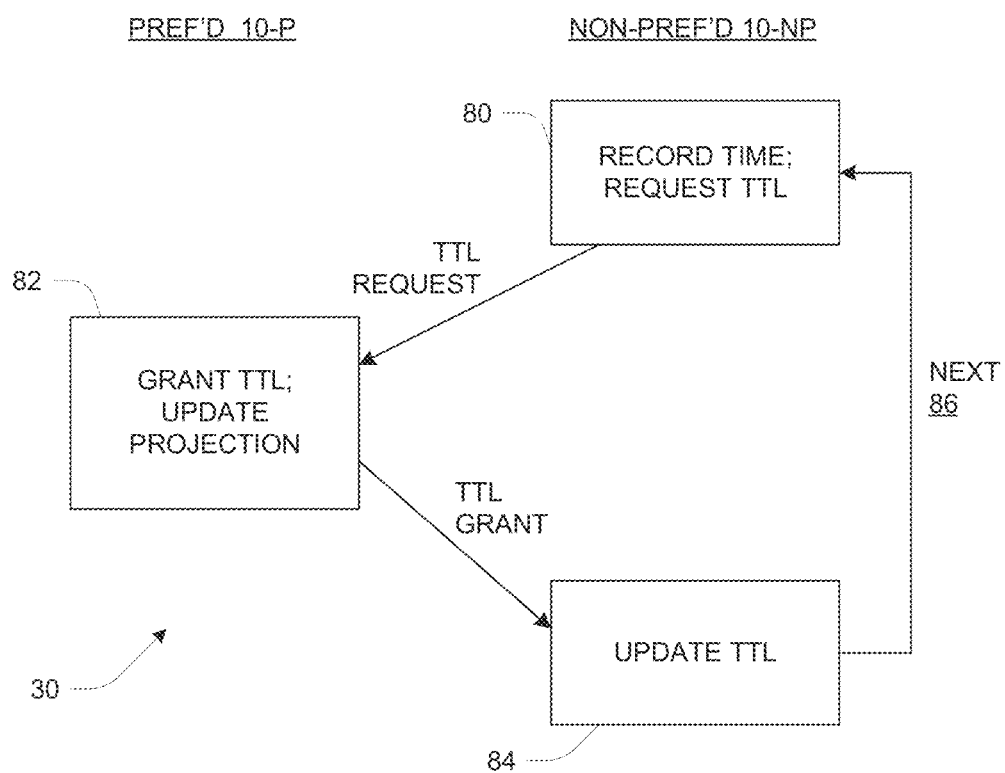
FIG. 5 is a messaging and flow diagram of basic operation of a time-to-live (TTL) mechanism.

FIG. 5 illustrates the essential operation of the TTL mechanism 30, in the form of a combination flow diagram and messaging diagram between a preferred DSS (Pref'd) 10-P and a non-preferred DSS (Non-Pref'd) 10-NP. Preferred and Non-Preferred statuses may be assigned by configuration data or system management activity preceding the illustrated operation. The assignment may be arbitrary or it may be based on some relevant substantive difference between the DSSs 10. Overall, operation is a succession of short loops based on a short timer (e.g., one second) at the non-preferred DSS 10-NP. A given iteration starts at 80 where the non-preferred DSS 10-NP records its local time and sends a TTL request message to the preferred DSS 10-P, requesting a new TTL period of ongoing operation. The duration of the TTL period is typically fixed and is some amount greater than the repetition period of the process, such as 5 seconds for example. At 82, the preferred DSS 10-P receives and processes the TTL request. It records its own local time, updates a projection of the TTL expiration time, and sends a message back to the non-preferred DSS 10-NP granting the new TTL. At 84 the non-preferred DSS 10-NP receives the grant message and uses it to update/refresh its own local TTL. This process iterates at regular intervals (e.g., one second) as indicated at Next 86.

Each of the DSSs 10 maintains a TTL expiration time, which is periodically refreshed and used in conjunction with a system time-of-day (TOD) to monitor for expiration of TTL. Whenever the TOD value is higher than the expiration time, it means TTL has expired and the DSS 10 initiates polarization. From time to time the "TTL expiration time" is updated (via TTL requests). Thus, under normal circumstances the "TTL expiration time" is always in the future, and as the TOD clocks is ticking, TTL updates keep moving the TTL expiration time ahead so that it stays in the future. If TTL updates stop, due to a failure, eventually the TOD clock progresses past the TTL expiration timer and polarization will be triggered.

The preferred DSS 10 uses its TTL expiration timer to track its projection of the expiration of the TTL timer at the non-preferred DSS 10-NP. When a failure occurs (which may be intermittent), TTL grant requests (or responses) are not being transferred on the link 24, and one or both arrays 10 see their TTL timer expiring. When an array timer expires, the array 10 stops servicing I/O requests and starts queuing them instead, while also invoking the quorum service 18 to resolve which of the two arrays 10 should survive. The TTL mechanism alone would dictate that only the preferred DSS 10-P should survive, if any. However, additional functionality involving the quorum service 18 can result in the non-preferred DSS 10-NP surviving in some cases, as explained more below. If only one of the arrays 10 has connectivity to the quorum service 18, it's a strong indication that the other DSS 10 has been isolated (e.g., in a data center failure), and the DSS 10 with the intact quorum connectivity should prevail even if it is the non-preferred DSS 10-NP. If both DSSs 10 have connectivity to the quorum service 18, the preferred DSS 10-P should be preferred to win.

Appendix—Failure Modes Analysis

The following presents a detailed description of various failure scenarios, desired outcomes, and how they are or may be handled by some combination of automated action (e.g., quorum service 18) and potentially manual action of an administrator. This description is generalized and may not apply to all embodiments, especially those that rely solely on the quorum service and do not support an overriding administrator control mechanism.

1. Assuming the same quorum service is always configured on both arrays, does not go down, does not lose state, and perfect communication paths between arrays and to the quorum service are available. It is sufficient if:

a. quorum service runs in a separate fault domain.
  b. quorum service exposes an API so either array can record taking over the volume transactionally
    i. "auto promote <volume id><first array id>"—OK, which is transactionally persisted by the quorum service as "<volume id> auto promoted <array id>"
    ii. the second "auto promote <volume id><second array id>"—FAIL as it's already promoted on the other array.
    iii. quorum service shall not process two calls for the same volume concurrently (should be easy to use a mutex based on input parameters).
  c. when polarization is invoked, the preferred array invokes "auto promote <volume id><winner id>" first
  d. the loser invokes "auto promote <volume id><loser id>" with certain delay (the same delay used by arrays to exchange TTL messages shall work)
    i. if the network link between arrays is broken—the preferred array auto promotes the volume.
    ii. if the non-preferred array/site goes down—the preferred array auto promotes the volume.
    iii. if the preferred array/site goes down—the non-preferred array auto promotes the volume.
  Note: arrays communicate with the quorum service while host I/O is not serviced.
2. If the quorum service does go down for some time:
  a. if the link between arrays breaks—neither array can contact the quorum service and both take the volume offline
  b. the non-preferred array/site goes down—the preferred cannot contact the quorum service and takes the volume offline
  c. the preferred array/site goes down—the non-preferred cannot contact the quorum service and takes the volume offline
  d. there are two solutions:
    i. both non-preferred and preferred continue trying to "auto promote <volume id><array id>" while they cannot communicate with each over during polarization. The first to receive OK from the quorum service once it's back online takes the volume back online.
    Note: it likely makes sense for the preferred to try more frequently, so if the link between arrays breaks, there is higher probability the preferred keeps the volume online.
    ii. admin manually promotes one of the sides if the link breaks, or the surviving array if one goes down. Before manual promote it is necessary to make sure the other side is down and will stay down. Else, the other side may "auto promote <volume id><array id>" to the quorum service once it's back online and take the out of sync side of the volume back online as well.
    iii. as a precaution, the array that was manually promoted shall periodically attempt to "manual promote <volume id><array id>". The quorum service shall just record "<volume id> manually promoted <array id>" and FAIL subsequent attempts to "auto promote <volume id><array id>", but still allow "manual promote <volume id><array id>" from the same of the other array.
  Note: it is assumed that components behave correctly and can trust each other.
3. If the communication paths to the quorum service experience long delays, lose packets or fail completely:
  a. the link between arrays breaks—if one of arrays has communication path to the quorum service it "auto promote <volume id><array id>"—OK and takes the volume online. The other side either can't communicate or "auto promote <volume id><array id>"—FAIL after number of retries, so its side of the volume stays offline.

i. an interesting corner case is when the preferred array invokes "auto promote <volume id><array id>" to the quorum service, which is recorded on the quorum service, but then the response is not delivered, so FAIL. Unless the preferred retries "auto promote <volume id><array id>" and receives OK, neither array will take the volume back online. So "auto promote <volume id><array id>" shall be idempotent.

b. the non-preferred array/site goes down—if the preferred can communicate with the quorum service it auto promotes the volume. If the preferred cannot communicate with the quorum service the only option is manual promote of the preferred side. Admin shall make sure the non-preferred side is down and will stay down.

c. the preferred array/site goes down—if the non-preferred array can communicate with the quorum service it auto promotes the volume. If the non-preferred cannot communicate with the quorum service the only option is manual promote of the non-preferred side. Admin shall make sure the preferred side is down and will stay down.

d. network delays or packet losses between non-preferred, preferred and the quorum service may either delay the quorum service receiving the request or an array receiving the response:

i. if "auto promote <volume id><array id>" is delivered to the quorum service with a delay, it's only handled once delivered.

ii. if "auto promote <volume id><array id>" request is lost, the state of overall system does not change.

iii. if response for "auto promote <volume id><array id>" is not delivered to an array it cannot keep or bring the volume online.

iv. arrays shall keep retrying "auto promote <volume id><array id>" until a response is received.

4. If a quorum service is configured on one array and no quorum service or a different quorum service is configured on the other array:

a. if the link between arrays fails, several scenarios are possible:

i. the preferred invokes "auto promote <volume id><array id>"—OK to the quorum service it is configured to use, and the non-preferred may send the same request and succeed to a different quorum service. As the result both arrays can take its sides of the volume online resulting in data corruption.

ii. the preferred may not be configured to use a quorum service in which case it will take its side of the volume online and the non-preferred "auto promote <volume id><array id>" to the quorum service it is configured to use. As the result both arrays could potentially take their sides of the volume online resulting in data corruption.

b. so the quorum service shall successfully complete "auto promote <volume id><array id>" only if there is certainty both arrays intend to use it.

c. this is accomplished with arrays periodically sending "register <volume id><array id>" once the quorum service is configured for use.

i. As soon as the quorum service receives "register <volume id><preferred id>" it persists "<volume id> registered <preferred id>". In this state attempts to "auto promote" shall fail.

ii. Once the quorum service receives "register <volume id><non-preferred id>" the record is updated to "<volume id> registered <preferred id><non-preferred id>" and either array can "auto promote <volume id><array id>"

d. sending "register <volume id><array id>" just once is sufficient to make sure both arrays intend to leverage the quorum service, however sending it periodically would allow the quorum service to reply that the other array has not yet registered to discover potential configuration problems—"register <volume id><preferred id>"—WARNING "the other array has not yet registered" and present an alert to the admin.

e. periodic communication with the quorum service also allows detecting communication problems early and warning the storage admin with an alert.

5. If the quorum service is removed or replaced with a different one:

a. if the link between arrays breaks, several scenarios are possible:

i. the preferred is no longer configured to use a quorum service so takes its side of the volume online and the non-preferred "auto promote <volume id><loser id>" to the quorum service it still uses and the preferred used to use. Since the preferred is still registered for the <volume id> on the quorum service both arrays can take its sides of the volume online resulting in data corruption.

ii. the preferred "auto promote <volume id><winner id>"—to the new quorum service it is configured to use which will FAIL (as the non-preferred is not registered), and the non-preferred "auto promote <volume id><loser id>" to the quorum service it still uses and the preferred used to use. As the result non-preferred takes its side of the volume online which does not align with user desired configuration.

b. this is solved with arrays unregistering from the quorum service by sending "unregister <volume id><array id>" to the quorum service as a part of quorum service reconfiguration. In this case:

i. the preferred is no longer configured to use a quorum service so takes its side of the volume online and the non-preferred "auto promote <volume id><non-preferred id>" to the quorum service FAIL as the other array is no longer registered to communicate through the quorum service.

ii. the preferred "auto promote <volume id><preferred id>"—to the new quorum service it is configured to use which will FAIL as the non-preferred is not yet registered for the volume, and the non-preferred "auto promote <volume id><non-preferred id>" to the quorum service it still uses which FAIL as well. The volume if offline on both sides which is likely the right outcome given the inconsistent configuration.

c. however, what if an array can no longer communicate with the quorum service that needs to be removed from the configuration, while the other array can? The following may be possible:

i. the preferred is no longer configured to use a quorum service, but it hasn't succeeded with "unregister <volume id><winner id>" to the quorum service. So it takes its side of the volume online and the non-preferred "auto promote <volume id><loser id>" to the quorum service it still uses and the preferred used to use. Since the preferred is still registered for the <volume id> on the quorum service both arrays can take its sides of the volume online resulting in data corruption.

d. such situation will not happen if arrays are in agreement as to which quorum service both use for a stretched volume or a volume group:

i. since the same quorum service can potentially be registered on individual arrays of the stretched pair using different IP addresses or FQDNs, quorum service shall generate a UUID and allow retrieving it "get uuid"

ii. arrays shall exchange quorum service uuid as part of TTL messages for polarization algorithm and only use quorum service for failure resolution if both intend to use the same quorum service. As soon as quorum service is removed from configuration or replaced, this is communicated as part of TTL message and both arrays shall not use the quorum service until consensus is achieved again.

iii. removing quorum service from preferred configuration while it cannot communicate to the peer and to the quorum service to make it bring its side of the volume online is a bad idea, and should perhaps be prohibited. As in such case the non-preferred may have brought its side of the volume online already if it can communicate with the quorum service.

e. Another possibility is that the preferred is no longer configured to use a quorum service, which it communicates to the peer array via TTL messages. So even though it didn't succeed with "unregister <volume id><winner id>" to the quorum service it can still take its side of the volume online, as the non-preferred won't attempt "auto promote <volume id><loser id>" knowing the quorum service configuration is inconsistent and shall not be used. The same applies for the case when non-preferred or preferred are reconfigured to use different quorum services—the pair simply falls back to using array preference.

6. If the quorum service loses its database or files:

a. if this happens while both arrays can communicate with each other and with the quorum service, the state will be soon restored via periodic "register <volume id><array id>" messages.

b. losing state while arrays cannot communicate with each other and the volume is auto promoted on one side appears to be worse. Couple ideas to recover state:

i. periodic snapshots/backups of quorum service persistence are prone to recovering old state within RPO. Seemingly maintaining ever incrementing transaction # with each "register" and "auto promote" shall allow the quorum service to catch inconsistency if an array invokes a quorum service API with transaction #, which is not increment by one. However this may become very complex very fast. Consider an example where the loser does "register <volume id><loser id>" with transaction #N, subsequently the link between arrays is broken and the winner does "auto promote <volume id><winner id>" with transaction #M. If the quorum service state is lost and the recovered state only has non-preferred transaction #N and not preferred transaction #M, then the loser can succeed with "auto promote <volume id><loser id>" transaction #N+1 bringing both sides online and corrupting the volume state.

ii. sending periodic "auto promoted <volume id><array id>" messages by the array that has the volume promoted, so once the quorum service state is lost and it starts with blank state, arrays populate it. This requires the quorum service to trust arrays maintaining proper state. This looks like a more reliable approach to restoring quorum service state.

7. If a TTL grant request from the non-preferred to the preferred is lost or delayed or TTL grant response from the preferred to the non-preferred is lost or delayed:

a. if at time t both the non-preferred and the preferred estimate loser's TTL as t+5 and TTL grant requests at t+1, t+2, . . . t+5 are lost, both non-preferred and preferred invoke polarization at t+5. The non-preferred is guaranteed to invoke polarization ahead of the preferred and the preferred is guaranteed to attempt auto promote ahead of the non-preferred. So if the preferred can communicate with the quorum service, it takes its side of the volume online and the non-preferred keeps its side offline.

b. if at time t both the non-preferred and the preferred estimate non-preferred TTL as t+5 and TTL grant requests at t+1, t+2, . . . t+5 are delivered to the preferred but all responses are lost or delivered with extreme delays, the non-preferred invokes polarization at t+5 while the preferred estimates loser's TTL as t+10. The preferred invokes polarization after the non-preferred but before the non-preferred attempts auto promote the volume with the quorum service. So if the preferred can communicate with the quorum service, it takes its side of the volume online and the non-preferred keeps its side offline. There is no possibility for split brain as well.

c. if at time t both the non-preferred and the preferred estimate non-preferred TTL as t+5 and TTL grant requests at t+1, t+2, t+5 are delivered with extreme delays that are becoming progressively worse at t+4, t+8, t+12, t+16, t+20 then the non-preferred invokes polarization at t+6 the latest (if it receives TTL grant sent by the preferred at t+4 for the request initiated at t+1) and the preferred extends TTL until t+9, t+13, t+17, t+21 and finally t+25. So if the preferred only receives read I/Os from the host, it has no way of knowing the non-preferred invoked polarization at t+6, communicated with the quorum service to auto promote the volume at t+16 and subsequently started servicing host Write I/O without replicating to the preferred resulting in split brain.

i. the preferred shall check the time at which TTL request is sent and ignore TTL requests (do not update non-preferred TTL estimate and do not send a response) that are more than 500 ms. old. In the example above, all TTL grant requests will be ignored by the preferred and both the preferred and the non-preferred will invoke polarization at t+5. To measure TTL requests age, array clocks need to be synchronized and one method is to use NTP.

The following scenarios may also be taken into account:

1. The link between arrays breaks, the preferred invokes "auto promote <volume id><preferred id>"—OK. However shortly after it goes down due to a rolling failure. In this case the non-preferred can be promoted manually to bring the volume back online. As part of promote it sends "manual promote <volume id><array id>".

2. Once both arrays are back online "<volume id> auto promoted <array id>" needs to be cleared, so if a failure happens again, the other array can promote the volume if required. This can be done with the array that has the volume promoted once again starting to send periodic "register <volume id><array id>" once it is in sync with the other array and both have the volume online.

3. It may happen that one of arrays hosting a stretched volume shall be replaced. In this case the volume shall be unstretched back to the surviving array and then stretched again to the new array. To make sure quorum service configuration is correct and does not contain more than two registered arrays for the same volume the following needs to be done:

a. when a volume is unstretched, the array hosting the volume "unregister <volume id><the other array id>" and "unregister <volume id><this array id>" to delete the volume record from the quorum service. b. it may happen the quorum service is not reachable when the volume is unstretched.

This situation can be solved by generating a new unique "stretched volume" id on stretching the volume to the new system.
  i. This will result with a left over record with the previous stretched volume id (with no longer correct arrays ids) and a new record with the new volume id (with correct array ids).
4. When an array (or rather stretched volume management logic) comes back online different situations are possible and need to be handled with care:
  a. first the array shall try connecting to the other array. If successful, ignore the quorum service state, negotiate which one has actual volume state, resync and start sending periodic "register <volume id><array id>"
  b. if cannot connect to the other array, attempt to auto promote the volume by sending "auto promote <volume id><array id>" to the quorum service, there can be several cases:
    i. cannot communicate with the quorum service due to it being offline or network issues. Keep the volume offline. Retry periodically. Periodically try connecting to the other array.
    ii. quorum service has lost its state, so auto promote attempt fails. Keep the volume offline and notify the admin of the failure and that manual promote is still an option.
    iii. the volume was already promoted by the other array, so auto promote fails. Keep the volume offline. Periodically try connecting to the other array.
    iv. the volume was not yet promoted, so auto promote attempt succeeds. Bring the volume online and start sending periodic "auto promoted <volume id><array id>"
    v. the volume was promoted by this array prior to the failure, so auto promote attempt succeeds. Bring the volume online and start sending periodic "auto promoted <volume id><array id>"

While various embodiments of the invention have been particularly shown and described, it will be understood by those skilled in the art that various changes in form and details may be made therein without departing from the scope of the invention as defined by the appended claims.

What is claimed is:

1. A method of providing a quorum service to a clustered pair of data storage nodes to protect against data corruption by failure of inter-node replication of write-type host I/O requests directed to a data storage object, comprising:
  during an initial period of normal operation in which the data storage nodes each provide host I/O access to the data storage object and each replicate write-type requests to the other data storage node, registering each of the data storage nodes to the quorum service in response to respective registration requests therefrom; and
  subsequently and based on both the data storage nodes being registered, (1) in response to receiving a first auto promote request from a first-requesting data storage node, returning a success response and entering an auto promoted condition, the success response indicating that the first-requesting data storage node is to continue providing the host I/O access to the data storage object without replicating the write-type host I/O requests to the other data storage node, and (2) in response to receiving a subsequent auto promote request from the other data storage node when in the auto promoted condition, returning a failure response indicating that the other data storage node is to cease providing host I/O access to the data storage object,
  wherein the quorum service operates according to a state transition scheme including an Empty state in which no data storage nodes are registered, a 2-registered state in which both of the data storage nodes are registered, and an Auto Promoted state corresponding to the auto promoted condition, and wherein the Auto Promoted state is reached during normal operation from the 2-Registered state and not from the Empty state.

2. The method according to claim 1, wherein the data storage object is one of a volume, volume group, file, file system, virtual volume, or container.

3. The method according to claim 1, wherein the data storage nodes employ a time-to-live mechanism by which a preferred one of the data storage nodes regularly grants permission for ongoing operation to the other data storage node as a non-preferred node, and wherein the first auto promote request is sent by the first-requesting data storage node upon expiration of a time to live for the non-preferred node.

4. The method according to claim 3, wherein the first-requesting data storage node is the preferred node, and the subsequent auto promote request is sent by the non-preferred node after a predetermined delay after expiration of the time to live.

5. The method according to claim 3, wherein the first-requesting data storage node is the non-preferred node, and the first auto promote request is sent by the non-preferred node after a predetermined delay after expiration of the time to live.

6. The method according to claim 1, wherein registering the data storage nodes includes receiving respective registration requests from the data storage nodes and registering each of the data storage nodes in response to its respective registration request.

7. The method according to claim 1, wherein the quorum service is restored to the Auto Promoted state from the Empty state in response to receiving an auto promoted request from a data storage node that was auto promoted during normal operation preceding a loss of state at the quorum service.

8. The method according to claim 1, wherein the state transition scheme further includes a Manual Promoted state reached in response to receiving a manual promote request from one of the data storage nodes based on action of an administrative user.

9. The method according to claim 1, wherein the quorum service generates a quorum service identifier and provides it to the data storage nodes in response to identifier requests therefrom, the quorum service identifier being used by the data storage nodes to confirm mutual use of the same quorum service for protection of the data storage object.

10. The method according to claim 1, wherein the state transition scheme further includes a 1-registered state in which only one of the data storage nodes is registered, and wherein the Auto Promoted state is reached during normal operation from the 2-Registered state and not from the 1-registered state.

11. A quorum service system comprising one or more computerized devices executing computer program instructions to cause the computerized devices to provide a quorum service to a clustered pair of data storage nodes to protect against data corruption by failure of inter-node replication of write-type host I/O requests directed to a data storage object, operation of the quorum service including:

During an initial period of normal operation in which the data storage nodes each provide host I/O access to the data storage object and each replicate write-type requests to the other data storage node, registering each of the data storage nodes to the quorum service in response to respective registration requests therefrom; and subsequently and based on both the data storage nodes being registered, (1) in response to receiving a first auto promote request from a first-requesting data storage node, returning a success response and entering an auto promoted condition, the success response indicating that the first-requesting data storage node is to continue providing the host I/O access to the data storage object without replicating the write-type host I/O requests to the other data storage node, and (2) in response to receiving a subsequent auto promote request from the other data storage node when in the auto promoted condition, returning a failure response indicating that the other data storage node is to cease providing host I/O access to the data storage object, wherein the quorum service operates according to a state transition scheme including an Empty state in which no data storage nodes are registered, a 2-registered state in which both of the data storage nodes are registered, and an Auto Promoted state corresponding to the auto promoted condition, and wherein the Auto Promoted state is reached during normal operation from the 2-Registered state and not from the Empty state.

12. The quorum service system according to claim 11, wherein the data storage object is one of a volume, volume group, file, file system, virtual volume, or container.

13. The quorum service system according to claim 11, wherein the data storage nodes employ a time-to-live mechanism by which a preferred one of the nodes regularly grants permission for ongoing operation to the other data storage node as a non-preferred node, and wherein the first auto promote request is sent by the first-requesting data storage node upon expiration of a time to live for the non-preferred node.

14. The quorum service system according to claim 13, wherein the first-requesting data storage node is the preferred node, and the subsequent auto promote request is sent by the non-preferred node after a predetermined delay after expiration of the time to live.

15. The quorum service system according to claim 13, wherein the first-requesting data storage node is the non-preferred node, and the first auto promote request is sent by the non-preferred node after a predetermined delay after expiration of the time to live.

16. The quorum service system according to claim 11, wherein registering the data storage nodes includes receiving respective registration requests from the data storage nodes and registering each of the data storage nodes in response to its respective registration request.

17. The quorum service system according to claim 11, wherein the quorum service is restored to the Auto Promoted state from the Empty state in response to receiving an auto promoted request from a data storage node that was auto promoted during normal operation preceding a loss of state at the quorum service.

18. The quorum service system according to claim 11, wherein the state transition scheme further includes a Manual Promoted state reached in response to receiving a manual promote request from one of the data storage nodes based on action of an administrative user.

19. The quorum service system according to claim 11, wherein the quorum service generates a quorum service identifier and provides it to the data storage nodes in response to identifier requests therefrom, the quorum service identifier being used by the data storage nodes to confirm mutual use of the same quorum service for protection of the data storage object.

20. The quorum service system according to claim 11, wherein the state transition scheme further includes a 1-registered state in which only one of the data storage nodes is registered, and wherein the Auto Promoted state is reached during normal operation from the 2-Registered state and not from the 1-registered state.

* * * * *